United States Patent [19]
Denoncourt et al.

[11] Patent Number: 4,904,551
[45] Date of Patent: Feb. 27, 1990

[54] CERAMIC SEAL ASSEMBLY

[75] Inventors: Peter J. Denoncourt; Guy G. Rampel; Kenneth R. Richardson; Orville G. Prickett, all of Gainesville, Fla.

[73] Assignee: Gates Energy Products, Inc., Gainesville, Fla.

[21] Appl. No.: 220,773

[22] Filed: Jul. 18, 1988

[51] Int. Cl.$^4$ .............................................. H01M 2/30
[52] U.S. Cl. .................. 429/181; 174/50.61; 174/152 GM; 429/101
[58] Field of Search ............... 429/101, 181; 174/50.61, 152 GM

[56] References Cited

U.S. PATENT DOCUMENTS

| 3,395,993 | 8/1968 | Bristow | 29/195 |
| 3,669,744 | 6/1972 | Tsenter et al. | 429/101 |
| 3,840,408 | 12/1974 | Bondley | 429/181 |
| 3,957,538 | 5/1976 | Fairweather, et al. | 136/133 |
| 4,071,663 | 1/1978 | Bredbenner | 429/181 |
| 4,112,204 | 9/1978 | McRae | 429/181 |
| 4,292,380 | 9/1981 | Boyle et al. | 429/101 |
| 4,377,404 | 3/1983 | Hoshikawa et al. | 174/152 GM |
| 4,467,020 | 8/1984 | Puglisi | 429/101 |
| 4,683,178 | 7/1987 | Stadnick et al. | 429/101 |

FOREIGN PATENT DOCUMENTS 0699492 11/1953 United Kingdom ....... 174/152 GM

OTHER PUBLICATIONS

Willard R. Scott et al., "Sealed-Cell Nickel-Cadmium Battery Applications Manual", NASA Reference Publication 1052, Dec., 1979, pp. 28-31.

Primary Examiner—Donald L. Walton
Attorney, Agent, or Firm—C. H. Castleman, Jr.; H. W. Oberg, Jr.

[57] ABSTRACT

A ceramic seal assembly for electrically insulating and hermetically securing a terminal to a housing through which the terminal extends. The housing contains a fluid at a high pressure and an electrical device to which the terminal is connected. An adapter is provided for hermetically securing the seal assembly to the housing. The adapter comprises a generally tubular member defining two end portions and a collar secured to one of the two end portions. The seal assembly and housing are hermetically secured to the tubular member at separate locations. The seal assembly contains at least one annular ceramic member and is oriented such that the high pressure fluid contained within the housing causes the annular ceramic member to be in compression and thereby maintain a seal between the terminal and the housing.

46 Claims, 2 Drawing Sheets

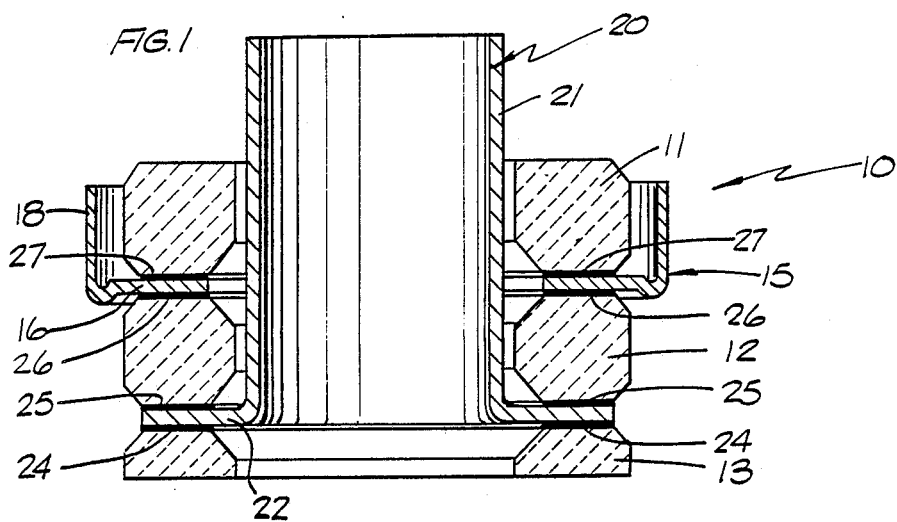
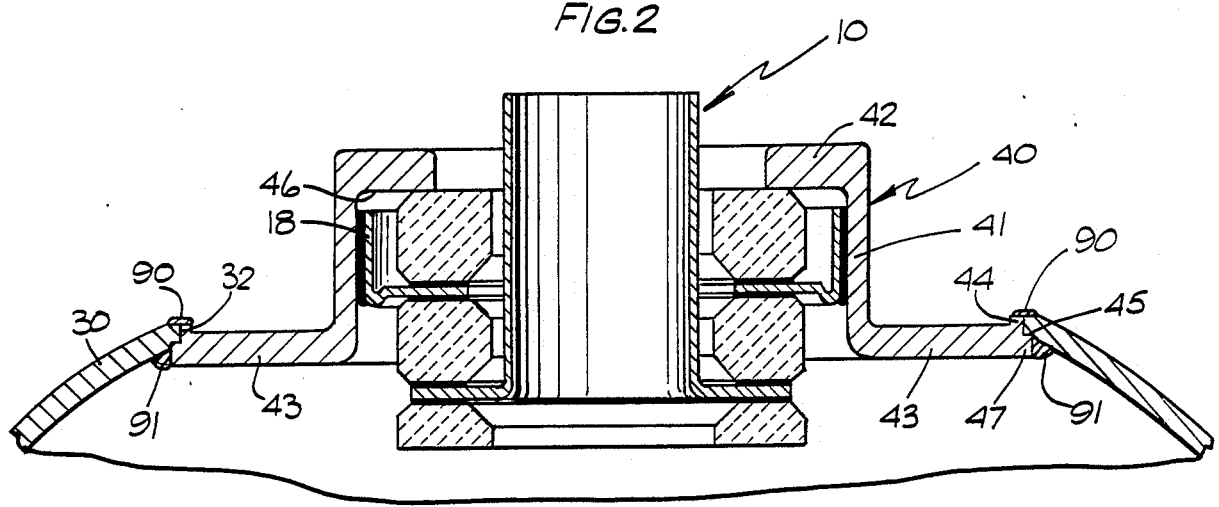
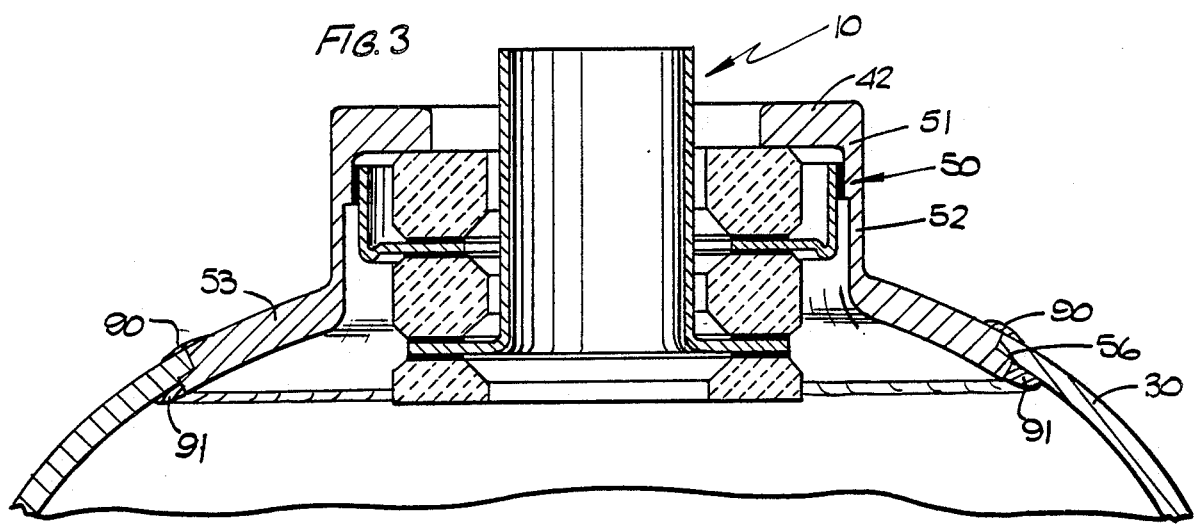

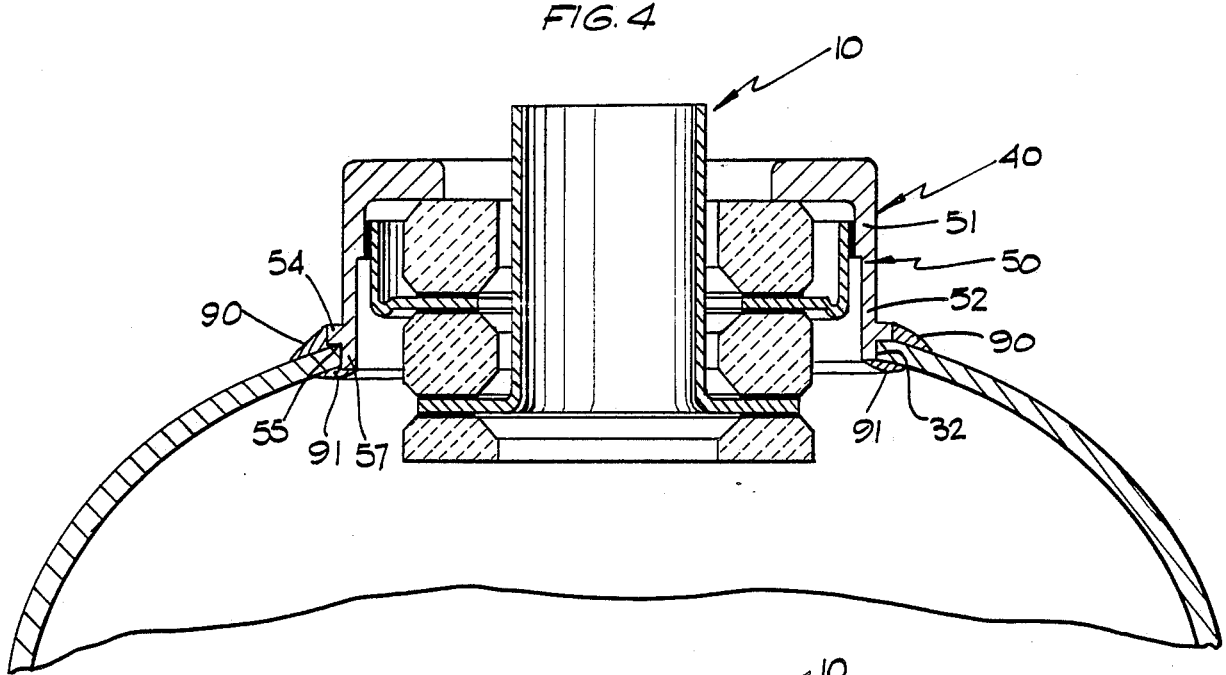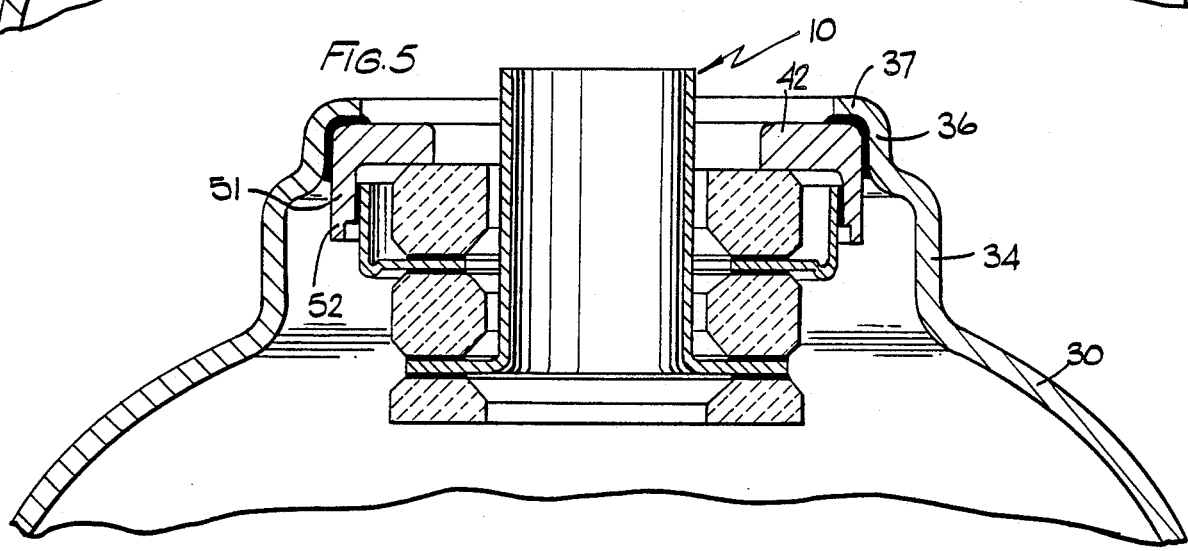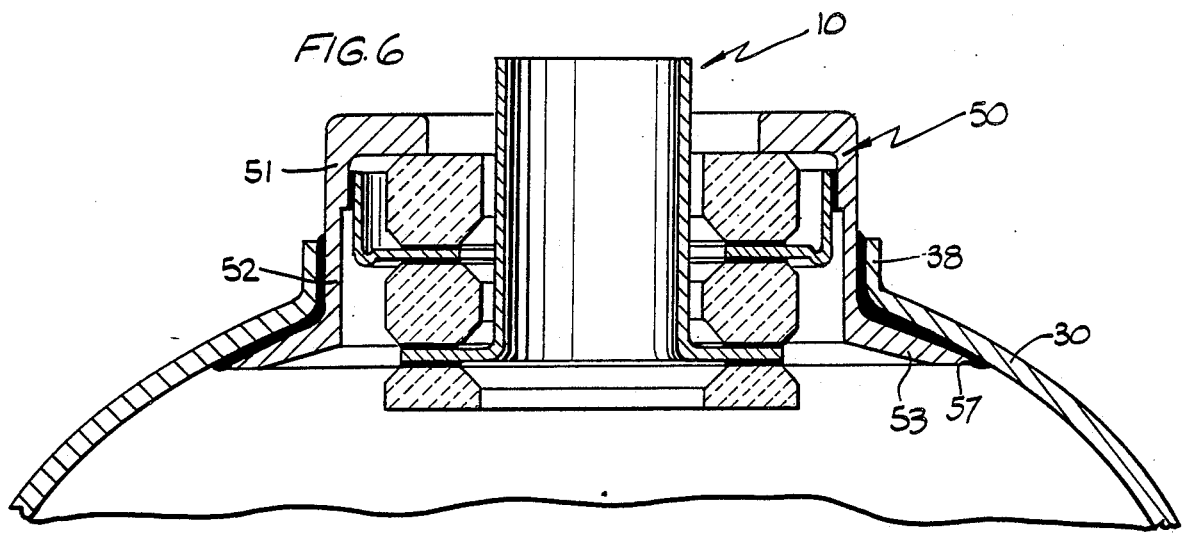

CERAMIC SEAL ASSEMBLY

BACKGROUND OF THE INVENTION

The present invention relates to a ceramic seal assembly for sealing and electrically insulating a terminal extending through the housing of an electrical device, and more particularly, to an adapter for hermetically securing a ceramic seal assembly to a housing, for example a battery housing such as a hydroformed pressure vessel used to house the components of a metal gas cell.

Relatively light weight, thin walled pressure vessels have been employed to house electrical devices, especially the components of a metal gas cell. For example, nickel hydrogen batteries include a plate stack encased within a sealed metal vessel. Conventionally, a sheet of metal, such as a nickel alloy, is hydroformed into a hollow cylindrically shaped member having one hemispherically configured end portion by stretching the sheet around an appropriately shaped mandrel. Two such members are welded together to form a cylindrically shaped vessel or casing having two hemispherically configured end portions. As thus conventionally manufactured, the pressure vessel walls have a thickness of about 0.020–0.050 inch. A terminal is electrically connected to the leads carrying a like electrical charge which emanate from one end of the plate stack and extends through an aperture provided in one of the end portions. Metal gas cells are typically charged with a gas under a relatively high pressure, such as hydrogen at about 700–1200 psig.

Conventionally, the hydroformed end portion of a metal gas pressure vessel has a formed neck portion which defines an aperture through which a terminal extends. A seal against fluid leakage between the vessel and the terminal has been accomplished in one of two manners. First, a substantially annular TEFLON plug is positioned around the terminal and is forced into the neck of the vessel. Such force causes the TEFLON plug to compress and flow to create a seal between the neck of the vessel and the terminal. Secondly, a substantially annular TEFLON plug is positioned around the terminal and is sized to be positioned within the neck of the vessel without being compressed. Thereafter, the neck is crushed, such as by crimping, to deform the TEFLON thereby causing the TEFLON to flow and to create a seal.

One problem associated with the use of a TEFLON seal is that the coefficient of thermal expansion of TEFLON is an order of magnitude greater than that of the metal of which the terminal or the pressure vessel is constructed. Pressure and thermal cycling during the life of a metal gas cell may cause a particular TEFLON seal to flow from 0.007–0.010 inch. Such flow creates the potential for development of a fluid leak, and therefore premature failure of an electrical device housed within the vessel. Another problem is that temperatures of 300° C. or greater which may be applied externally to terminals so as to solder external leads thereto will cause TEFLON seals to melt.

Accordingly, it is an object of the present invention to provide for a seal assembly for an electrical device housed within a thin walled pressure vessel which will seal and electrically insulate a terminal extending through the vessel against fluid leakage over repeated pressure and thermal cycling.

Another object of the present invention is to provide for a seal assembly for an electrical device housed within a thin walled pressure vessel which can withstand the temperature associated with soldering external leads to a terminal extending through the vessel without any alteration in structure or function.

A further object of the present invention is to provide an adapter for hermetically securing a seal assembly to a pressure vessel housing an electrical device which is capable of withstanding repeated high pressure and thermal cycling without failing.

SUMMARY OF THE INVENTION

To achieve the foregoing and other objects, and in accordance with the purposes of the present invention, as embodied and broadly described herein, one characterization of the present invention comprises an assembly for sealing a terminal extending through a housing containing a fluid and an electrical device to which the terminal is connected. The assembly has a substantially cylindrical tube secured to the terminal, a collar secured to the housing, a first substantially annular ceramic member positioned around the tube and hermetically secured to the tube and the collar, and a second substantially annular ceramic member positioned around the tube and hermetically secured to the collar. The first and second substantially annular ceramic members are restrained against outward axial movement from said housing. The assembly, and therefore, the first and second substantially annular ceramic members, are oriented within said housing such that forces exerted upon the first and second substantially annular ceramic members by increasing fluid pressure within the housing causes the first and second substantially annular members to be in compression and thereby maintain a seal between the terminal and the housing.

In another characterization of the present invention, an adapter is provided for connecting a vessel which contains a fluid at an elevated pressure to a seal assembly which is secured to a terminal extending through an aperture in the vessel. The adapter comprises a generally tubular member defining two end portions and a collar secured to one of said two end portions and extending inwardly about substantially the entire circumference of the tubular member. The seal assembly and the vessel are hermetically secured to the tubular member at distinct locations.

In yet another characterization of the present invention, an apparatus is provided and comprise a vessel containing a fluid at a high pressure and having at least one aperture therethrough, a terminal extending through the aperture, an assembly for electrically insulating and sealing the terminal and the vessel against leakage of fluid, and a device for hermetically securing the assembly to the vessel. The device restrains the assembly from outward axial movement with respect to the vessel. The assembly has at least one ceramic seal member.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1 is a cross-sectional view depicting the ceramic seal assembly of the present invention;

FIG. 2 is partially cutaway, cross-sectional view depicting an embodiment of the adapter of the present FIG. 3 is partially cutaway, cross-sectional view depicting an embodiment of the adapter of the present invention as assembled to the ceramic seal assembly of FIG. 1 and to a vessel;

FIG. 4 is partially cutaway, cross-sectional view depicting an embodiment of the adapter of the present invention as assembled to the ceramic seal assembly of FIG. 1 and to a vessel;

FIG. 5 is partially cutaway, cross-sectional view depicting an embodiment of the adapter of the present invention as assembled to the ceramic seal assembly of FIG. 1 and to a vessel; and FIG. 6 is partially cutaway, cross-sectional view depicting an embodiment of the adapter of the present invention as assembled to the ceramic seal assembly of FIG. 1 and to a vessel;

DETAILED DESCRIPTION OF THE PREFERRED EMBODIMENTS

A ceramic seal assembly illustrated generally as 10 in FIG. 1 is comprised of three annular ceramic members 11, 12 and 13, sleeve 20, and collar 15. Sleeve 20 is a substantially cylindrical tube 21 defining two ends, one of which has a substantially annular flange 22 integrally formed or fixedly secured thereto. A terminal connected to an electrical device, such as a battery, can be inserted through and hermetically secured to tube 21 by any suitable means, such as by a circumferentially extending, continuous tungsten inert gas weld. Collar 15 has a substantially annular portion 16 integrally formed or fixedly secured to a substantially circular rim portion 18 which is disposed at a predetermined angle, preferably 90°, to annular portion 16. The exact configuration of rim portion 18, as well as the angle at which it is disposed with respect to annular portion 16, may vary depending on the particular application as will be within the purview of one skilled in the art. As assembled, annular ceramic members 11 and 12 are positioned around tube 21. One substantially annular surface of annular ceramic member 13 is secured to one side of flange 22 by means of a hermetic ceramic-to-metal seal 24 which may be formed by conventional techniques as fully detailed by U.S. Pat. No. 3,395,993, the disclosure of which is incorporated herein by reference. In a like manner, one substantially annular surface of annular ceramic member 12 is secured to the other face of flange 22 by a hermetic ceramic-to-metal seal 25. An opposing substantially annular face of ceramic annular member 12 is secured to one face of annular portion 16 of collar 15 by a hermetic ceramic-to-metal seal 26. A substantially annular face of ceramic annular member 11 is secured to the other face of first member 16, again by a hermetic ceramic-to-metal seal 27.

In accordance with the present invention and as illustrated in FIG. 2, seal assembly 10 is oriented with respect to a pressure vessel 30 such that rim portion 18 of collar 15 extends toward the exterior of vessel 30 and flange 22 of sleeve 20 is positioned within the interior of vessel 30. Pressure vessel 30 houses an electrical device and contains a fluid under elevated pressure. As thus oriented, ceramic-to-metal seals 24, 25, 26, and 27 are subjected to compression forces by the pressurized fluid contained within vessel 30. Such orientation is contrary to the conventional orientation of a seal assembly 10 in low pressure nickel cadmium battery applications. However, it has been found that the conventional orientation of a seal assembly 10 to seal a terminal with respect to a pressure vessel 30 containing a fluid at elevated pressure, e.g. 700–1200 psi., places ceramic-to-metal seals 25, 26 and 27 in tension resulting in premature failure of seal assembly 10. As utilized through this specification, the term "fluid" includes both a gas and a liquid.

As further illustrated in FIG. 2, the adapter of the present invention is illustrated generally as 40 and is utilized to fixedly secure seal assembly 10 to the pressure vessel 30. It has been found that attempts to secure seal assembly 10 directly to a thin walled (e.g., 0.016–0.030 in.), light weight vessel 30 by means of brazing has resulted in premature cell failure during hydraulic pressure cycling from 0 to 900 psig. at a rate of 10,000 cycles per day. In accordance with the present invention, an adapter 40 is utilized to fixedly secure and hermetically seal assembly 10 to vessel 30. Generally the adapter 40 comprises a tubular body portion 41 defining two end portions and a collar 42 integrally formed with one of the end portions and extending inwardly about substantially the entire circumference of tubular body portion 41 thus forming a substantially annular shoulder 46.

As illustrated in FIG. 2, one embodiment of adapter 40 of the present invention has a substantially annular flange 43 integrally formed with the other of the end portions of tubular body portion 41. A substantially annular rim 44 protrudes from one surface of flange 43. Rim 44 and end portion 47 of flange 43 define a substantially annular bracket 45. Utilizing the adapter illustrated in FIG. 2, seal assembly 10 is oriented in the manner described above and is sized to be and is positioned within tubular body portion 41 of adapter 40 such that annular ceramic member 11 abuts shoulder 46. Seal assembly 10, in particular annular ceramic members 11, 12, and 13, is restrained against outward axial movement caused by forces exerted by the relatively high pressure of fluid within vessel 30 by engagement of annular ceramic member 11 with collar 42. Seal assembly 10 is hermetically secured by a braze to adapter 40 along substantially the entire interface between rim portion 18 of collar member 15 and tubular body portion 41. The braze can be formed by interposing a ring of suitable braze material, for example, a "NIORO" nickel-gold brazing alloy manufactured by Western Gold and Platinum Company, a division of GTE Products Corporation, between rim portion 18 and tubular body portion 41 during assembly and heating this material to a temperature effective to form a braze by any suitable means, such as a vacuum furnace. Thereafter, the adapter 40 and seal assembly 10 are positioned within the aperture formed within pressure vessel 30 such that edge 32 of vessel 30 registers with annular bracket 45. The adapter 40 is secured to vessel 30 at this juncture by means of two separate welds 90, 91 which extend along the entire juncture. Preferably, welds 90 and 91 are electron beam welds. Although adapter 40 may be machined, from any suitable light weight material, preferably Inconel 718 which is a nickel alloy manufactured by the International Nickel Company is employed. In the embodiment illustrated in FIG. 2, adapter 40 is of a substantially uniform thickness, e.g. 0.050 inch. The thickness of pressure vessel 30 is less than that of adapter 40, for example 0.016–0.030 inch. A circumferentially extending notch, not illustrated, could be provided in flange 43 in lieu of rim 44 and end portion 47 to register with edge 32 of vessel 30.

In another embodiment of the present invention illustrated in FIG. 3, adapter 40 is provided with a tubular body portion illustrated generally as 50 which comprises a first portion 51 being of substantially the same thickness as collar 42 and flange 53, e.g. 0.050 inch, and a second portion 52 of reduced thickness, e.g. 0.026 inch. Seal assembly 10 is positioned within tubular body portion 50 such that annular ceramic member 11 abuts shoulder 46 and is hermetically secured to adapter 40 by brazing along substantially the entire interface between rim portion 18 of collar 15 and first portion 51. Accordingly, it will be appreciated that the amount of braze material necessary to hermetically secure seal assembly 10 to adapter 40 is significantly less in the embodiment of FIG. 3 resulting in cost savings and reduced weight. In addition, the internal relief provided by the reduced thickness of second portion 52 facilitates the brazing process. Flange 53 has a frusto conical shape to provide for a relatively smooth transition at the juncture of flange 53 with vessel 30. Adapter 40 is secured to vessel 30 in the manner described above with respect to FIG. 2, except that circumferentially extending notch 56 has been machined into flange 53 and registers with edge 32 of vessel 30.

In the embodiment illustrated in FIG. 4, adapter 40 is provided with a tubular body portion 50 having a first portion 51 which is substantially the same thickness as collar 42, e.g. 0.050 inch, and a second portion 52 of reduced thickness, e.g. 0.026 inch. A substantially annular rim 54 protrudes from the exterior surface of second portion 52. Rim 54 and end portion 57 define a substantially annular bracket 55. As oriented and assembled in accordance with the present invention, seal assembly 10 and adapter 40 are inserted into the aperture of vessel 30 from the exterior of vessel 30 until edge 32 of vessel 30 registers with bracket 55. As previously described, adapter 40 is hermetically secured to vessel 30 at this juncture by two separate circumferentially extending welds 90, 91, which are preferably electron beam welds. Although not illustrated, a circumferentially extending notch could be provided in second portion 52 in lieu of rim 54 and end portion 57 to register with edge 32 of vessel 30.

Referring to FIG. 5, pressure vessel 30 may be embossed with a stepped, neck portion having an aperture therethrough and defining a first tubular portion 34 and a second tubular portion 36 of reduced internal and external diameters. The end of second tubular portion 36 is provided with an inwardly extending flange 37. The embodiment of the adapter 40 illustrated in FIG. 5 is similar to the adapter illustrated in FIG. 4 except second portion 52 is reduced in length and is not provided with rim 54. As oriented and assembled in accordance with the present invention, seal assembly 10 and adapter 40 are inserted into the aperture of vessel 30 from within vessel 30 until collar 42 abuts flange 37. Thereafter, adapter 40 is hermetically secured to vessel 30 by means of a braze along the entire interface between first tubular portion 51 and collar 42 of flange 40 and second tubular portion 36 and flange 37 of vessel 30. The braze may be formed by inserting a suitably configured ring of braze material between the neck portion of vessel 30 and the adapter 40 during assembly and heating this material to a temperature effective to form a braze joint.

The embodiment of the adapter illustrated in FIG. 6 is similar in configuration to the adapter of FIG. 3 except that flange 53 is substantially uniformly tapered from a thickness of, for example 0.050 inch, at approximately the middle of flange 53 to a thickness of, for example 0.012 inch, at the edge 57 thereof. The surface of flange 53 which contacts vessel 30 is configured to correspond with the shape of that portion of vessel 30 which mates with flange 53. Vessel 30 may be provided with a upturned neck portion 38, as illustrated, to interface with the tubular portion 50 of adapter 40. Adapter 40 is hermetically secured to vessel 30 by means of a braze along substantially the entire interface between tubular portion 50 and flange 53 of adapter 40 and vessel 30 including neck portion 38, if provided.

The following examples describe the manner and process of making and using the present invention and set forth the best mode contemplated by the inventors of carrying out the invention but are not to be construed as limiting the scope thereof.

EXAMPLE 1

A test vessel was constructed from two 0.024 inch thick, hydroformed, hemispherically configured domes which were machined with apertures to receive an adapter and seal assembly configured and oriented as illustrated in FIG. 3. The seal assembly was brazed to the adapter in the manner described above with respect to FIG. 3. An adapter and seal assembly was mated with each dome and hermetically sealed and secured thereto by means of an electron beam (EB) weld applied from the outside of the vessel and a separate EB weld applied from the inside of the pressure vessel. The domes were then girth welded to each other utilizing a 0.019 inch weld ring and tungsten inert gas (TIG) equipment to form a spherical test vessel. The vessel was constructed of Inconel 718 and was age-hardened. The vessel was fitted with caps on a fill tube on one end and a compression fitting at the other end. The vessel was first pressurized with $H_2$ to 900 psi. and the fittings and seals checked for hermeticity using a $H_2$ sniffer. Upon finding no indications of fluid leakage the vessel was vented, completely filled with water, and connected to automatic pressure cycler equipment. The system as thus assembled was checked for fluid leaks and adjusted to 900 psi. Pressure cycling was conducted continuously at a rate of 10,000 cycles per day for 45,000 cycles of 0–900 psi. and was followed by a burst pressure test to 3,000 psig. The tests did not result in any failure, and upon subsequent analysis, there was no evidence of fatigue or leakage (less than $10^{-7}$ cc/sec He) at either the dome/adapter weld or the seal assembly.

EXAMPLE 2

A spherical test vessel was constructed in accordance with Example 1 except that dome and adapter configurations of FIG. 5 were utilized in lieu of the FIG. 3 configurations. When the seal assembly of FIG. 1 was brazed to the adapter the internal periphery of the portion of the adapter machined to have a reduced thickness was filled with braze material. The vessel was successfully tested in accordance with the procedure set forth in Example 1 for 57,000 pressure cycles with no evidence of fatigue, cracking or impending failure of any component.

EXAMPLE 3

Two separate test vessels were each formed by rolling a 0.027 inch thick sheet of Inconel 718 into a cylindrically configured container and welding the abutting edges of the sheet together by tungsten inert gas (TIG) welding. Two hollow, hemispherically configured end portions hydroformed from sheets of Inconel 718 and having a nominal thickness of 0.027 inch were assembled to separate edges of the container by interposing, axially aligning, and externally and circumferentially welding a weld ring by means of a TIG welder. The weld ring was constructed of Inconel 718. Each dome was embossed to form a neck and an adapter/seal assembly configured in accordance with FIG. 6 was secured thereto by means of brazing. Each vessel was fitted with caps on a fill tube at one end and a compression fitting at the other end. Each vessel was first pressurized with $H_2$ to 900 psi. and the fittings and seals were checked for hermeticity using a $H_2$ sniffer. Upon no indications of fluid leakage the vessels were vented, completely filled with water, and connected to automatic pressure cycler equipment. The system as assembled was checked for fluid leak and adjusted to 900 psi.

The test vessels were tested in parallel using a common hydraulic cylinder. Pressure cycling was conducted continuously for 45,000 cycles of 0–900 psi. The automatic system was monitored hourly, recording cycle number and maximum pressure. At the conclusion of the 45,000 cycles, the test vessels were visually examined for evidence of leakage or other degradation of which none was determined. No $H_2$ leakage was detected. Finally, the test vessels were pressurized with helium to 900 psi. and checked for hermeticity using a mass spectrometer. The indicated leakage rate was $2.5 \times 10^{-7}$ cc/sec from each test vessel. The background level (vessels with no helium) was found to be $6.4 \times 10^{-8}$ to $6.4 \times 10^{-8}$ cc/sec.

Following the leak test, the vessels were individually pressurized until they burst at 2775 and 2950 psi. In bursting the vessels, the point of failure was the cylinder side of the girth weld on one and the seam weld near the middle of the cylinder on the other. Metallographic analysis of seal components after burst showed no material defects or impending failure points in the seal components. One of the seal brazements was subjected to 400 pounds of axial (inward) force after the burst test with no observable mechanical failure in any of the many brazed joints or components.

While the preferred embodiments have been fully described and depicted for the purpose of explaining the principles of the present invention, it will be appreciated by those skilled in the art that modifications, substantiations, and changes may be made thereto without departing from the scope of the invention set forth in the appended claims.

We claim:

1. In an assembly for sealing a terminal extending through a housing containing a fluid and an electrical device to which the terminal is connected, the assembly having a substantially cylindrical tube hermetically secured to the terminal, a collar secured to the housing, a first substantially annular ceramic member positioned around the tube and hermetically secured to the tube and the collar, and a second substantially annular ceramic member positioned around the tube and hermetically secured to the collar, the improvement comprising:
   means for restraining said first and said second substantially annular ceramic members against axial movement outwardly from said housing; and
   an orientation of said first and said second substantially annular ceramic members within said housing such that forces exerted upon said first and said second substantially annular ceramic members by increasing fluid pressure within said housing causes said first and said second substantially annular ceramic members in cooperation with said restraining means to be in compression and thereby maintain a seal between said terminal and said housing.

2. The improvement of claim 1 wherein said first annular ceramic member defines at least one first substantially annular face which is juxtaposed to said tube and at least one second substantially annular face which is opposed to said at least one first face, said orientation permitting said fluid pressure to act only on said at least one second face.

3. The improvement of claim 1 wherein a third substantially annular ceramic member is secured to said tube and is compressed by said fluid pressure.

4. An adapter for connecting a vessel which contains a fluid at an elevated pressure to a ceramic seal assembly which is hermetically secured to a terminal extending through an aperture in said vessel, said adapter comprising:
   a generally tubular member defining two end portions; said tubular member having a first portion and a second portion, said second portion having an internal diameter greater than the internal diameter of said first portion and a thickness less than the thickness of said first portion; and
   a collar secured to one of said two end portions and extending inwardly about substantially the entire circumference of said tubular member, said tubular member being hermetically securable to said seal assembly and to said vessel at distinct locations.

5. The adapter of claim 4 wherein said first portion of said tubular member is hermetically securable to said seal assembly.

6. The adapter of claim 5 wherein said first portion of said tubular member is hermetically securable to said seal assembly by a braze.

7. The adapter of claim 5 wherein said second portion of said tubular member is hermetically securable to said vessel.

8. The adapter of claim 7 wherein said second portion has a substantially annular rim protruding outwardly therefrom, said rim and the other of said two end portions defining a substantially annular bracket, said aperture defining an edge in said vessel which is capable of mating with said bracket.

9. The adapter of claim 8 wherein said second portion of said tubular member is hermetically securable to said vessel by two separate circumferentially extending welds.

10. The adapter of claim 5 wherein said first portion of said tubular member is hermetically securable to said vessel.

11. The adapter of claim 10 wherein said vessel is provided with a neck portion having said aperture therethrough and defining a first tubular portion and a second tubular portion having a smaller internal and external diameter than said first tubular portion, said first portion of said tubular member is hermetically securable to said first tubular portion of said neck portion.

12. The adapter of claim 10 wherein said first portion of said tubular member is hermetically securable to said vessel by a braze.

13. The adapter of claim 12 wherein said first tubular portion of said neck portion has an inwardly extending flange, said first portion of said tubular member being hermetically securable to said first tubular portion and said inwardly extending flange of said neck portion.

14. The adapter of claim 4 wherein the other of said two end portions of said tubular member is defined by said second portion of said tubular member and is provided with an outwardly extending flange, said flange being hermetically securable to said vessel.

15. The adapter of claim 14 wherein said flange has a generally frustro-conical shape.

16. The adapter of claim 15 wherein said flange is provided with a circumferentially extending notch which is capable of mating with an edge of said vessel.

17. The adapter of claim 16 wherein said end portion of said flange is hermetically securable to said notch by two separate circumferentially extending welds.

18. The adapter of claim 15 wherein said flange is substantially uniformly tapered from a location at approximately the middle of said flange to the edge of the flange.

19. The adapter of claim 18 wherein a surface of said flange is configured to correspond with the configuration of a portion of said vessel which said flange is capable of mating with.

20. The adapter of claim 19 wherein said flange is hermetically securable to said portion of said vessel by a braze.

21. An adapter for connecting a vessel which contains a fluid at an elevated pressure to a seal assembly which is hermetically secured to a terminal extending through an aperture in said vessel, said adapter comprising:
   a generally tubular member defining two end portions; and
   a collar secured to one of said two end portions and extending inwardly about substantially the entire circumference of said tubular member, said tubular member being hermetically securable to said seal assembly and to said vessel at distinct locations;
   the other of said two end portions of said tubular member being provided with an outwardly extending flange, said flange being hermetically securable to said vessel; and wherein
   said flange has a substantially annular rim protruding outwardly from an end portion of said flange, said rim and said end portion of said flange defining a substantially annular bracket, said aperture defining an edge in said vessel which is capable of mating with said bracket.

22. The adapter of claim 21 wherein said flange of said tubular member is heremetically securable to said vessel by two separate circumferentially extending welds.

23. An apparatus comprising:
   a vessel containing a fluid at a high pressure and having at least one aperture therethrough;
   a terminal extending through said aperture;
   means for electrically insulating said terminal and sealing said terminal and said vessel against leakage of said fluid, said sealing means having at least one ceramic seal member subjected to compression forces by the pressurized fluid within the vessel; and
   means distinct from the vessel for hermetically securing said insulating and sealing means to said vessel, said securing means restraining said insulating and sealing means from outward axial movement with respect to said vessel.

24. An apparatus comprising:
   a vessel containing a fluid at a high pressure and having at least one aperture therethrough;
   a terminal extending through said aperture;
   means for electrically insulating said terminal and sealing said terminal and said vessel against leakage of said fluid, said sealing means having at least one ceramic seal member; and
   means for hermetically securing said insulating and sealing means to said vessel, said securing means comprising
   a generally tubular member defining two end portions and
   a collar secured to one of said two end portions and extending inwardly about substantially the entire circumference of said tubular member, said insulating and sealing means and said vessel being hermetically secured to said tubular member at distinct locations, said securing means restraining said insulating and sealing means from outward axial movement with respect to said vessel.

25. The apparatus of claim 24 wherein said tubular member is hermetically secured to said seal assembly by a braze.

26. The apparatus of claim 24 wherein said tubular member has a first portion and a second portion, said second portion having an internal diameter greater than the internal diameter of said first portion and a thickness less than the thickness of said first portion.

27. The apparatus of claim 26 wherein said insulating and sealing means is hermetically secured to said first portion of said tubular member.

28. The apparatus of claim 27 wherein said insulating and sealing means is hermetically secured to said first portion of said tubular member by a braze.

29. The apparatus of claim 27 wherein said vessel is hermetically secured to said second portion of said tubular member.

30. The apparatus of claim 29 wherein said second portion has a substantially annular rim protruding outwardly therefrom, said rim and the other of said two end portions defining a substantially annular bracket, said vessel having an aperture therethrough defining an edge in said vessel which mates with said bracket.

31. The apparatus of claim 30 wherein said second portion of said tubular member is hermetically secured to said vessel by two separate circumferentially extending welds.

32. The apparatus of claim 26 wherein the other of said two end portions of said tubular member is defined by said second portion of said tubular member and is provided with an outwardly extending flange, said flange being hermetically secured to said vessel.

33. The apparatus of claim 27 wherein said vessel is hermetically secured to said first portion of said tubular member.

34. The apparatus of claim 33 wherein said vessel is provided with a neck portion having said aperture therethrough and defining a first tubular portion and a second tubular portion having a smaller internal and external diameter than said first tubular portion, said first tubular portion of said neck portion being secured to said first portion of said tubular member.

35. The apparatus of claim 33 wherein said vessel is hermetically secured to said first portion of said tubular member by a braze.

36. The apparatus of claim 35 wherein said first tubular portion of said neck portion has an inwardly extending flange, said first portion of said tubular member being hermetically secured to said first tubular portion and said inwardly extending flange of said neck portion.

37. The apparatus of claim 24 wherein the other of said two end portions of said tubular member is provided with an outwardly extending flange, said vessel being hermetically secured to said flange.

38. The apparatus of claim 37 wherein said flange is disposed with respect to said tubular body at an angle of about 90°.

39. The apparatus of claim 38 wherein said flange as a generally frustro-conical shape.

40. The apparatus of claim 39 wherein said flange is provided with a circumferentially extending notch which registers with an end portion of said flange.

41. The apparatus of claim 40 wherein said end portion of said flange is hermetically secured to said notch by two separate circumferentially extending welds.

42. The apparatus of claim 39 wherein said flange is substantially uniformly tapered from a location at approximately the middle of said flange to the edge of the flange.

43. The apparatus of claim 42 wherein a surface of said flange is configured to correspond with the configuration of a portion of said vessel which said flange is capable of mating with, said flange being hermetically secured to said portion of said vessel.

44. The apparatus of claim 43 wherein said flange is hermetically secured to said portion of said vessel by a braze.

45. The apparatus of claim 37 wherein said flange has a substantially annular rim protruding outwardly from an end portion of said flange, said rim and said end portion of said flange defining a substantially annular bracket, said vessel having an aperture therethrough which defines an edge in said vessel which mates with said bracket.

46. The apparatus of claim 45 wherein said flange of said tubular member is hermetically secured to said vessel by two separate circumferentially extending welds.

* * * * *